June 30, 1964 R. W. BLUNK 3,138,994
GUN MOUNT
Filed April 18, 1963
Fig.1
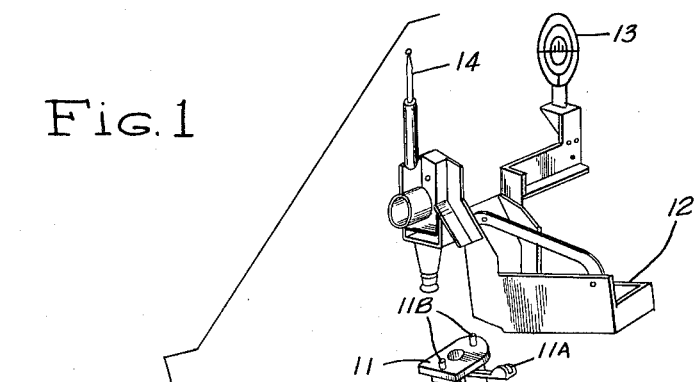
Fig.2
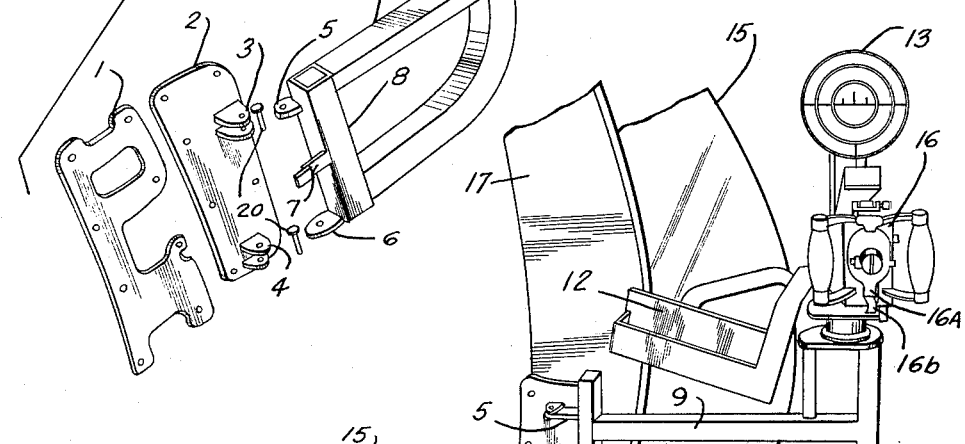
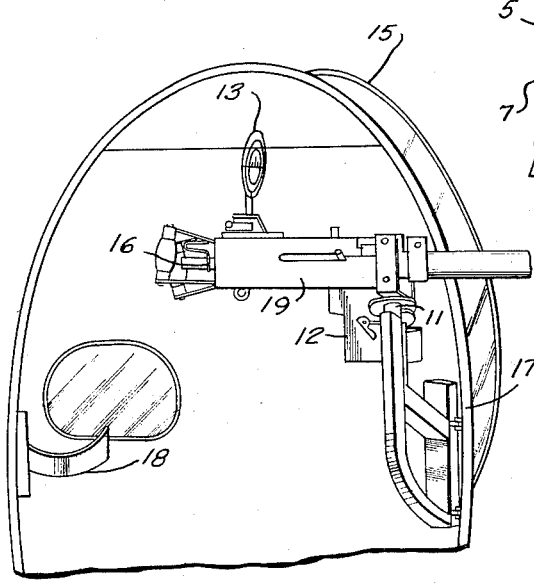
Fig.3
INVENTOR.
ROBERT W. BLUNK.
BY Joseph A. Hill
ATTORNEY

3,138,994
GUN MOUNT
Robert W. Blunk, Camas, Wash., assignor to the United States of America as represented by the Secretary of the Army
Filed Apr. 18, 1963, Ser. No. 274,066
3 Claims. (Cl. 89—37)
(Granted under Title 35, U.S. Code (1952), sec. 266)

The invention described herein may be manufactured and used by or for the Government for governmental purposes without the payment to me of any royalty thereon.

With the increasing use of helicopters for transportation, police work and in direct support of ground troops in both combat and counterinsurgency operations, a need has developed for a gun mount which would enable the gunner to fire a machine gun from either the side or the rear door of a helicopter with a maximum freedom of action.

Previous aircraft door machine gun mounts were of the bar type, mounted between the frames of the door. These mounts, having the pivotal point of the machine gun within the door itself, restricted the traverse in the forward door of a helicopter to approximately 135°. In addition, it was necessary with the use of a horizontal bar mount to place the ammunition carrier on top rather than along side and below the receiver of the weapon. With the ammunition carrier and feeder on top of the weapon, it was impossible to mount thereupon an effective aerial type wide scope sight system. The mounting of such sights on top of a machine gun is extremely desirable if the gun is to be operated from the rear by a gunner in a standing or kneeling position.

It is therefore an object of the instant invention to provide a gun mount suitable for mounting machine guns in vehicle doors in such a way that the traverse and scope of fire of the machine gun will be at a maximum.

It is a second object of this invention to provide, in combination with a machine gun mount for vehicle doors, an ammunition carrier for the machine gun which is side mounted thereby allowing an aerial sighting system to be mounted atop the weapon.

Other objects of this invention will be apparent to those skilled in the art upon examination of the following figures in which:

FIG. 1 is a perspective disassembled view of the major components of the mount and its appurtenances;

FIG. 2 is another perspective view of the machine gun bracket and mount on a side vehicle door, looking from the rear to the front of the weapon, and towards the front side of the side door; and FIG. 3 is a view from the outside of an aircraft door showing in perspective the machine gun bracket, a side view of a portion of a machine gun, as well as a perspective view of the gunner's safety bar and windshield.

Briefly, the invention comprises a hinge mounted swinging bracket, a pintle-type machine gun mount, side ammunition carrier means for a machine gun, and an aerial type sight. Desirable though not necessary additional features of this invention are a windbreak or windshield and a safety bar for the gunner.

Referring now in detail to FIG. 1, rear backing plate 1 is a rigid or semirigid plate cut to fit the contour of the vehicle door, and in approximately the same shape as front backing plate 2 below. It is drilled to correspond with the bolt holes of forward backing plate 2 and designed to give purchase to the fastening means of forward backing plate 2 through the door frame. A fiber gasket (not shown) may be used between the door frame 17 and the mounting plates to avoid the metal to metal contact and the consequent vibration noises.

Forward backing plate 2 is also cut to fit the contour of the door frame. Hinge yokes 3 and 4 are welded thereon to receive hinge tongues 5 and 6 of the swing mount. Forward backing plate 2 is bolted through the door frame to rear backing plate 1.

Hinge pins 20 hold swing mount 11 in hinged relationship with forward backing plate 2. The swing mount comprises vertical channel member 8 equipped with hinge tongues 5 and 6 and stop 7. Rigidly affixed to the lower end of channel member 8 is J-shaped channel member 10, the distal end of which projects well above the uppermost point of the hinge. Horizontal channel member 9 is rigidly affixed to the upper end of channel member 8 and to the vertical part of channel member 10. At the top of the distal end of channel member 10 is a conventional machine gun pintle housing 11 with conventional lock 11a. It will be noted that tongue 6 is somewhat longer than tongue 5. The lengths of these tongues are variable and depend upon the position of the frame of the door (if an aircraft door) in both the landed and flying positions. It may be preferable to lengthen or shorten the lower tongue in order to obtain the correct level of fire when an aircraft is sitting on the ground and loading or unloading troops. This would provide an ideal level of fire from the fixed landed position and would not interfere unduly with the use of the machine gun 19 in flight.

The configuration of the swing mount is not critical. Any gate-like or bracket-like structure will suffice. It is only necessary to provide the strength necessary to hold the weapon for which the mount is designed while firing.

Various stops may be incorporated into the mount assembly or around the barrel of the weapon in order to prevent the firing of the weapon into the vehicle itself or into the wheels or rotor blades (or propellors) of an aircraft. These stops, such as those shown at 11b, may limit the traverse of the weapon and prevent its shooting into the nose or front of the vehicle. Limiting of the swing mount with respect to the door frame is accomplished by stop 7 which prevents the swing mount from coming too far back into the vehicle and prevents an accidental shooting into the interior.

Referring to FIGS. 1–3, ammunition carrier 12 is in the form of any conventional side-mounted ammunition carrier such as that presently used on United States Army Caliber 50 heavy machine guns. A light weight material such as aluminum is desirable but not essential for aircraft use. Such an ammunition carrier may be bolted to the side of the machine gun or utilize holes already drilled in the rear and front sight assemblies of existing machine guns. The carrier is a platform with low sides, adapted to carry snugly an ammunition box of conventional design, so as to allow the ammunition belt to feed directly into the receiver of the gun.

Rear sight 13 and front sight 14 show aerial sights typical of those suitable for use with a swinging aircraft mount. In the rear sight depicted, the rings are of 6 inches, 4 inches, and 2 inches diameter, respectively. The lead posts on either side of the center post provide for an angle of approximately 16 mils, this being graduated for targets of about 175 yards in distance and of conventional size. Any aerial sight system which furnishes the gunner lead assistance and wide panoramic vision orientation is suitable for use in connection with this mount. Post sight 14 is preferably retractable, adjustable in height and equipped with a diamond shaped tip, yellow in color. It is desirable but not essential that both sights be folding.

A double handle grip back plate 16 is provided for use with the swing mount in order to afford the gunner more stability. This feature helps compensate for the inherent loss of stability in a free moving mount. These grips are similar to those presently in use with conventional United States Army Caliber 50 heavy machine guns. Trigger 16b is mounted between the twin grips for the convenience of the gunner, and is partially protected by projection 16a.

Projecting outwardly along the forward portion of the door (where guns are mounted in aircraft side doors) is windshield 15 preferably of Plexiglas construction so disposed as to deflect the wind from the gunner. At the back of the side doors is safety bar 18, which is a substantially J-shaped bar projecting outwardly and substantially horizontally so that the gunner, while firing with the mount extended outwardly from the door, will have some means of preventing a fall. The safety bar allows the gunner to lean into its concave portion with his hip or thigh. This bar may be detachably, pivotally, or hinge mounted so that it may be removed or folded inside when the gun mount is not in use.

The gun mount, as described, permits about 205° traverse, and firing of the weapon under and forward of an aircraft nose. Its side ammunition carrier allows a high mounting position; and loading of the belt is simplified by the elimination of the feeder on an overhead carrier. In addition, it may be modified to fold out of the way (without removal) when not in use.

I claim:

1. In combination with a vehicle doorway, a small caliber firing system comprising a small caliber weapon having pintle-type traverse and connection means, a swinging extension bracket hinge mounted to the frame of said door, said bracket including in its distal portion a pintle housing for said pintle-type traverse and connection means, side ammunition carrier means for said small caliber weapon, aerial sight means mounted on and above said small caliber weapon, double handle aiming and firing means for said small caliber weapon, wind deflection means for said door of said vehicle, and a substantially J-shaped safety bar mounted on said frame of said vehicle door so disposed with respect to said small caliber weapon as to allow the gunner to lean against said safety bar while firing said weapon when said bracket is extended away from said vehicle.

2. In combination with a small caliber weapon having a pintle-type traverse and connecting means, a weapon swinging extension mount carried by an inclined support surface, said mount comprising a hinge bar mounted on the inclined support surface and a bracket portion affixed to swing freely about said hinge bar, said bracket having in its distal portion a pintle housing for said pintle-type traverse and connection means, and said bracket being connected to said hinge bar by upper and lower tongue and yoke means, said lower tongue and yoke means being of different length than said upper tongue and yoke means to eliminate the weapon cant which would otherwise be caused by the inclined weapon mount support surface.

3. The combination, with a small caliber weapon having a pintle-type traverse and connection means, of a side-attached ammunition carrier means; aerial sight means; double handle holding and aiming means; and a swinging extension weapon mounting means, said weapon mounting means comprising a hinge bar mounted on an inclined support surface, and a bracket affixed to freely swing about said hinge and having in its distal portion a pintle housing; said bracket being connected to said hinge bar by upper and lower tongue and yoke means, said lower tongue and yoke means being of different length than said upper tongue and yoke means to eliminate the weapon cant which would otherwise be caused by the inclined weapon mount support surface.

References Cited in the file of this patent
UNITED STATES PATENTS

| | | |
|---|---|---|
| 1,592,490 | Inglis | July 13, 1926 |
| 2,143,900 | Rarey | Jan. 17, 1939 |